United States Patent
Frank

(10) Patent No.: US 8,045,501 B2
(45) Date of Patent: Oct. 25, 2011

(54) METHOD AND APPARATUS FOR SIGNALING UPLINK SCHEDULING INFORMATION

(75) Inventor: Colin Frank, Park Ridge, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 841 days.

(21) Appl. No.: 12/024,499

(22) Filed: Feb. 1, 2008

(65) Prior Publication Data

US 2009/0197587 A1 Aug. 6, 2009

(51) Int. Cl.
*H04B 7/185* (2006.01)

(52) U.S. Cl. ............... 370/317; 370/310.2; 370/328; 370/349; 455/63.1; 455/67.13; 455/114.2; 455/278.1; 455/296; 455/422.1; 455/450; 455/452.1; 455/501; 455/570

(58) Field of Classification Search ........... 370/310.2, 370/317, 328–339, 349; 455/63.1, 67.13, 455/114.2, 278.1, 296, 422.1, 450, 452.1, 455/501, 570
See application file for complete search history.

(56) References Cited

U.S. PATENT DOCUMENTS

| | | | |
|---|---|---|---|
| 2006/0015674 A1* | 1/2006 | Murotake | 711/101 |
| 2007/0161376 A1* | 7/2007 | Hulkkonen et al. | 455/447 |

OTHER PUBLICATIONS

3GPP TS 43.064 V7.7.0 (Nov. 2007); 3rd Generation Partnership Project; Technical Specification Group GSM/EDGE Radio Access Network; General Packet Radio Service (GPRS); Overall description of the GPRS radio interface; Stage 2 (Release 7); Global System for Mobile Communications.
3GPP TS 45.003 V7.3.0 (Nov. 2007) 3rd Generation Partnership Project; Technical Specification Group GSM/EDGE Radio Access Network; Channel coding (Release 7); Global System for Mobile Communications.
PCT Search Report Issued in Related PCT Application No. PCT/US2009/032075 on Jun. 8, 2009.
Nokia Siemens Networks & Nokia; "Support of Common USF Multiplexing for Red Hot"; 3 GPP TSG GERAN #36; Vancouver, Canada; Nov. 7, 2007.
Motorola; Methods for Multiplexing of EGPRS2-B With EGPRS2-A and EGPRS on the Downlink; 3GPP TSG GERAN #37; Seoul, Korea; Feb. 18, 2008.
Digital Cellular Telecommunications System (Phase 2+); General Packet Radio Service (GPRS); Overall description of the GPRS radio interface; Stage 2 (3GPP TS 43.064 Version 7.7.0 Release 7); Cedex, France; Jan. 1, 2008.
Nokia Siemens Networks et al: "Multiplexing EGPRS and EGPRS2 MS in DL"3GPP TSG GERAN #37; Seoul, South Korea; Feb. 13, 2008.
Motorola et al., "On RED HOT B USF Detection by RED HOT A Mobiles", 3GPP TSG GERAN#36 Tdoc GP-071743, Nov. 12, 2007, pp. 1-10, Vancouver Canada.

* cited by examiner

*Primary Examiner* — Aung S Moe
*Assistant Examiner* — Hoon J Chung
(74) *Attorney, Agent, or Firm* — Matthew C. Loppnow; Prass LLP.; Sylvia Chen

(57) ABSTRACT

A method (300) and apparatus (200) for signaling uplink scheduling information is disclosed. The method may include determining (320) whether an enhanced general packet radio service 2-B mobile device and an enhanced general packet radio service non-2-B mobile device are assigned to a same uplink time slot. The method may also include limiting (330) downlink communications to Ap and B radio link control block families when sending packet data to the enhanced general packet radio service 2-B mobile device, if the enhanced general packet radio service 2-B mobile device and the enhanced general packet radio service non-2-B mobile device are assigned to the same uplink time slot.

20 Claims, 5 Drawing Sheets

METHOD AND APPARATUS FOR SIGNALING UPLINK SCHEDULING INFORMATION

BACKGROUND

1. Field

The present disclosure is directed to wireless communication devices. More particularly, the present disclosure is directed to a method and apparatus for signaling uplink scheduling information.

2. Introduction

Wireless communication devices used in today's society include mobile phones, personal digital assistants, portable computers, and various other electronic communication devices. New wireless technologies are continually being developed to support increasing demands for better reliability during voice calls, for improved throughput during Internet and other data connections, and for other desirable features. These new wireless technologies are often designed to accommodate older wireless technologies so users of older wireless communication devices can still use their devices on newer networks and, conversely, so that users of newer wireless communication devices can use their devices on older networks.

Unfortunately, such backward compatibility may hinder the full potential of new wireless technologies. For example, an older mobile phone using an older technology, such as Enhanced General Packet Radio Service (EGPRS), may operate on the same channel as a newer mobile phone using a newer variant of EGPRS technology, such as Enhanced General Packet Radio Service 2-B (EGPRS2-B). To ensure proper communications for the older EGPRS mobile phone, however, the newer EGPRS2-B mobile phone may be forced to use the older EGPRS technology for its communications and may accordingly experience reduced performance. Such is the case when both an EGPRS mobile device and an EGPRS2-B mobile device are assigned to a same uplink time slot by a base station serving both mobile devices.

Thus, there is a need for methods and apparatus for signaling uplink scheduling information that provides for increased performance when a newer, backward-compatible wireless device and an older, non-forward-compatible wireless device are assigned to a same uplink time slot by a base station serving both wireless devices.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

A method and apparatus for signaling uplink scheduling information is disclosed that provides for increased performance when two devices, using different but related wireless technologies, are assigned to a same uplink time slot. The method may include determining whether an enhanced general packet radio service 2-B mobile device and an enhanced general packet radio service non-2-B mobile device are assigned to a same uplink time slot. The method may also include limiting downlink communications to Ap and B radio link control block families when sending packet data blocks to the enhanced general packet radio service 2-B mobile device, if the enhanced general packet radio service 2-B mobile device and the enhanced general packet radio service non-2-B mobile device are assigned to the same uplink time slot.

Figure 1:
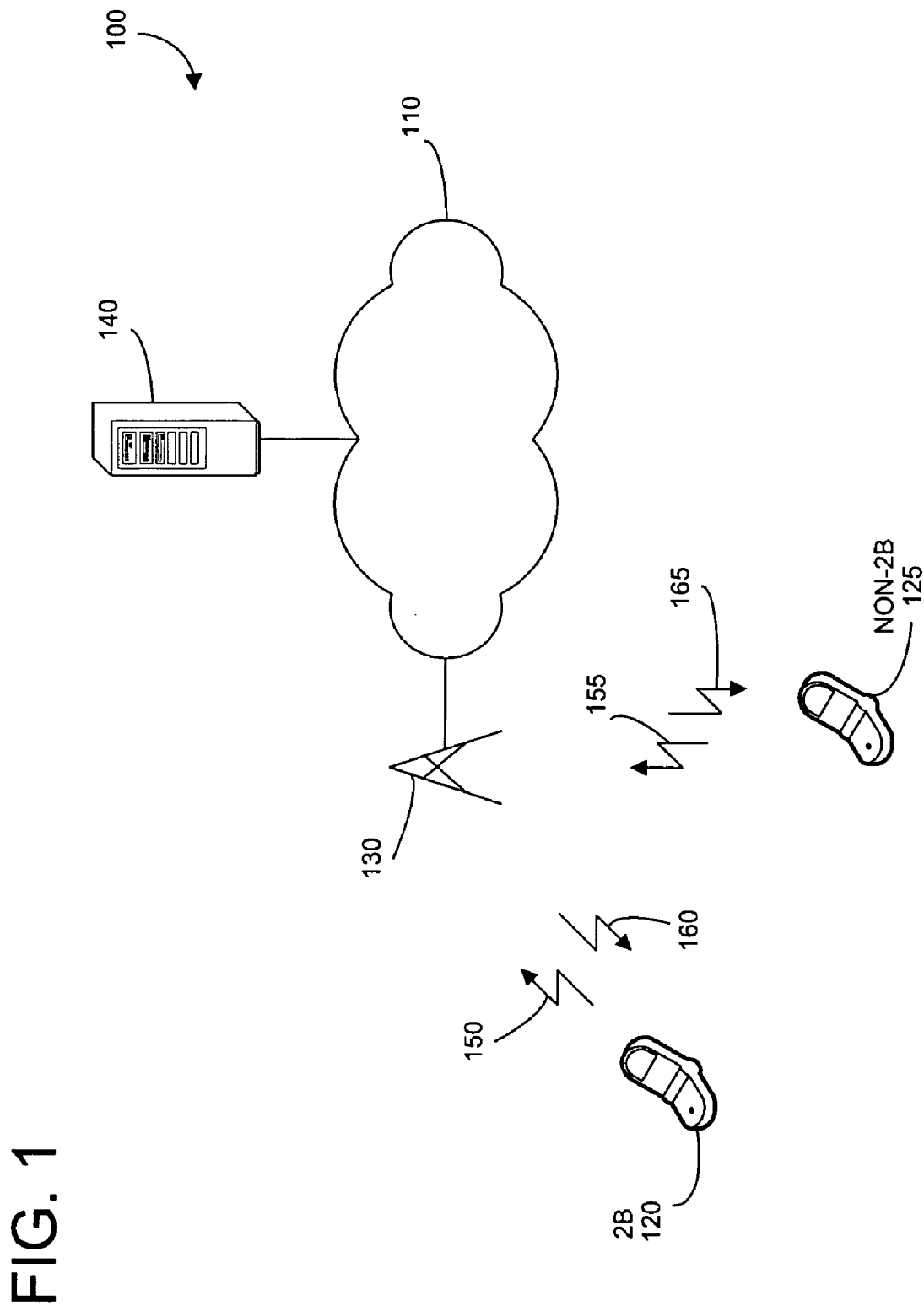
FIG. 1 illustrates an example diagram of a system in accordance with one embodiment.

FIG. 1 is an example block diagram of a system 100 according to one embodiment. The system 100 can include a network 110, terminals 120 and 125 such as mobile devices, a base station 130, and a network controller 140. The terminals 120, 125 may be wireless communication devices, such as a wireless telephone, a cellular telephone, a personal digital assistant, a pager, a personal computer, a selective call receiver, or any other device that is capable of sending and receiving communication signals on a network including a radio access network. The terminals 120, 125 can send uplink signals 150, 155 and receive downlink signals 160, 165. In this example, the terminal 120 is an EGPRS2-B mobile device that uses EGPRS2-B technology and the terminal 125 is an EGPRS non-2-B mobile device that uses EGPRS technology that is not EGPRS2-B. An EGPRS non-2-B mobile device may use EGPRS or EGPRS2-A technology.

In this example embodiment, the network controller 140 is connected to the network 110. The network controller 140 may be located at a base station, at a radio network controller, or anywhere else in the network 110. The network 110 may include any type of network that is capable of sending and receiving signals, such as wired or wireless signals. Furthermore, the network 110 may include more than one network and may include a plurality of different types of networks. Thus, the network 110 may include a plurality of data networks, a plurality of telecommunications networks, a combination of data and telecommunications networks, and other like communication systems capable of sending and receiving communication signals.

In operation, the system 100 can determine whether an enhanced general packet radio service 2-B mobile device and an enhanced general packet radio service non-2-B mobile device are assigned to a same uplink time slot. The system 100 can limit downlink communications to communications selected from the group of Ap and B radio link control block families when sending packet data to the enhanced general packet radio service 2-B mobile device, if the enhanced general packet radio service 2-B mobile device and the enhanced general packet radio service non-2-B mobile device are assigned to the same uplink time slot. The Ap radio link control block family currently includes packet data block types DAS-6, DAS-9, DAS-11, and DBS-11; and the B radio link control block family currently includes DAS-5, DAS-8, DBS-5, DBS-7, and DBS-9. The system 100 can multiplex signals for the enhanced general packet radio service non-2-B mobile device with the enhanced general packet radio service 2-B mobile device in a single downlink time slot. The system 100 can switch between a non-2-B enhanced general packet radio service packet data block type and a 2-B enhanced general packet radio service packet data block type within a radio link control block family while sending packet data to the enhanced general packet radio service 2-B mobile device during a Temporary Block Flow (TBF).

According to a related embodiment, for General Packet Radio Service (GPRS) and EGPRS, Uplink State Flags (USFS) can be transmitted on the downlink 160, 165 and used by a base station to inform a mobile device of permission to transmit on a subsequent uplink time slot. Based on GPRS and EGPRS technology, every uplink time slot can be associated with a downlink time slot. If a mobile device is assigned to a particular uplink time slot, it can monitor the USF transmitted on the corresponding downlink time slot for a notification that it is permitted to transmit during a later uplink time slot. On the downlink, the USF and one or more encoded packet data blocks can be transmitted together; however, the USF and the packet data blocks may not be intended for the same mobile device. The USF may be intended to grant uplink permission to a first mobile device, while the encoded packet data blocks may be intended for a second mobile device.

Up to eight mobile devices can be assigned to a particular uplink time slot, and thus there can be eight possible values of USFs. Accordingly, when a mobile device is assigned to a particular uplink time slot, it can also be also allocated a particular value of USF, which can be used to indicate a grant of permission to transmit on the next corresponding uplink time slot. Two mobile devices can be "USF multiplexed" if they are assigned to the same uplink time slot.

When GPRS and EGPRS mobile devices are USF-multiplexed on the same time slot, there may be a problem in that the GPRS terminal may not be able to read the EGPRS USF. Previously, if the network wanted to send packet data blocks to the EGPRS mobile device and a USF to the GPRS mobile device during the same downlink time slot, GPRS modulation and coding schemes (MCS) must be used to transmit the packet data blocks. This can reduce system throughput on the downlink since EGPRS includes higher rate 8 PSK (3 code symbols per modulation symbol) modulation and coding schemes, while the GPRS coding schemes CS 1-4 all use GMSK (1 code symbol per modulation symbol). Thus, when transmitting packet data blocks to the EGPRS mobile device and a USF to the GPRS mobile device during the same time slot, it may be necessary to reduce the data rate to the EGPRS mobile device by 67% in order to transmit the USF in a format that the GPRS mobile device can understand.

Recently in a Global System for Mobile communication (GSM) Enhanced Data rates for GSM/EDGE Radio Access Network (GERAN) meeting, new modulation and coding schemes have been defined which increase the downlink throughput. These modulation and coding schemes (also called packet data block types) are implemented in EGPRS2-A technology and EGPRS2-B technology, which are also known as RED HOT A and RED HOT B, where RED HOT denotes Reduced Symbol Duration, Higher Order Modulation and Turbo Codes. These newer EGPRS2 packet data block types have the following properties:

EGPRS2-A: Legacy symbol rate (271 ksps)
    Turbo-codes
    8 PSK, 16 QAM, 32 QAM
EGPRS2-B: 1.2× legacy GSM symbol rate (325 ksps)
    Turbo-codes
    QPSK, 16 QAM, 32 QAM where 8 PSK refers to 8 phase shift keying, 16 QAM refers to 16 quadrature amplitude modulation, 32 QAM refers to 32 quadrature amplitude modulation, and QPSK refers to quadrature phase shift keying.

Some exemplary aspects of the packet data block types are illustrated in the following two tables:

TABLE 1

Packet data block types for EGPRS-2-A

| MCS | DAS-5 | DAS-6 | DAS-7 | DAS-8 | DAS-9 | DAS-10 | DAS-11 | DAS-12 |
|---|---|---|---|---|---|---|---|---|
| Modulation | | 8PSK | | | 16QAM | | 32QAM | |
| Family | B | Ap | D | B | Ap | D | Ap | D |
| Bitrate [kbps/TS] | 22.4 | 27.2 | 32.8 | 44.8 | 54.4 | 65.6 | 81.6 | 98.4 |
| # RLC data blocks | | 1 | | 2 | | 2 | 3 | |
| Payload [octets] | 1 × 56 | 1 × 68 | 1 × 82 | 2 × 56 | 2 × 68 | 2 × 82 | 3 × 68 | 3 × 82 |

TABLE 2

Packet data block types for EGPRS2-B

| MCS | DBS-5 | DBS-6 | DBS-7 | DBS-8 | DBS-9 | DBS-10 | DBS-11 | DBS-12 |
|---|---|---|---|---|---|---|---|---|
| Modulation | QPSK | | | 16QAM | | | 32QAM | |
| Family | B | A | B | A | B | A | Ap | A |
| Bitrate [kbps/TS] | 22.4 | 29.6 | 44.8 | 59.2 | 67.2 | 88.8 | 108.8 | 118.4 |
| # RLC data blocks | 1 | 1 | 2 | 2 | 3 | 3 | 4 | 4 |
| Payload [octets] | 1 × 56 | 1 × 74 | 2 × 56 | 2 × 74 | 3 × 56 | 3 × 74 | 4 × 68 | 4 × 74 |

The acronym DAS refers to a Downlink 2-A Scheme, and DBS refers to a Downlink 2-B Scheme. Other packet data block types may be used such as Coding Scheme (CS) 1-4, Modulation and Coding Schemes (MCS) 1-9, Uplink 2-A Schemes (UAS), and Uplink 2B Schemes (UBS). A Radio Link Control (RLC) block can belong to one of the Ap, B, D, and A RLC block families.

With the definition of new mobile classes of terminals capable of supporting EGPRS2-A and EGPRS2-B technologies, these new mobile classes may be multiplexed both with the existing mobile classes and each other. In particular, the following USF multiplexing combinations may be used:

i) USF multiplexing of packet data blocks for EGPRS2-A mobile devices with USF information for EGPRS mobile devices, ii) USF multiplexing of packet data blocks for EGPRS2-B mobile devices with USF information for EGPRS mobile devices, and iii) USF multiplexing of packet data blocks for EGPRS2-B mobile devices with USF information for EGPRS2-A mobile devices.

EGPRS2-A and EGPRS2-B mobile devices may have the following capabilities:

An EGPRS2-A mobile device may be able to decode the USF information in all GPRS, EGPRS, and EGPRS2-A blocks. More generally, the EGPRS2-A mobile device can support all GPRS, EGPRS, and EGPRS2-A packet data block types.

An EGPRS2-B mobile device may be able to decode the USF information in all GPRS, EGPRS, EGPRS2-A, and EGPRS2-B blocks. More generally, the EGPRS2-B mobile device can support all GPRS, EGPRS, EGPRS2-A, and EGPRS2-B packet data block types.

The USF encoding used for packet data block types DAS-5, DAS-6, and DAS-7, which all use 8 PSK modulation, is exactly the same as for EGPRS packet data block types MCS 5-9. Thus, as long as the EGPRS2-A mobile device uses DAS-5, DAS-6, or DAS-7, an EGPRS mobile device can demodulate and decode multiplexed USF information received during the same downlink time slot.

The EGPRS2-A and EGPRS2-B packet data block types have family relations where, within a family, all of the modulation and coding schemes can use the same turbo encoder. For each modulation and coding scheme, three puncturing patterns can be defined. If the mobile station supports incremental redundancy, a different puncturing pattern can be used for the initial transmission and each retransmission. Packet data block types in the same RLC block family use the same RLC block size. Any packet data block type within the same family can be used to re-transmit RLC blocks initially transmitted using another packet data block type in the same family.

EGPRS2-B was designed to be backwards compatible with EGPRS. If the USF was being transmitted to an EGPRS mobile device while data is being transmitted to the EGPRS2-B mobile device, packet data block types MCS-2 and MCS-3 had to be used to transmit data to the EGPRS2-B mobile device. Because MCS-2 and MCS-3 both use GMSK modulation, the data rates of these services can be dramatically less than the data rates of packet data block types DBS-5 through DBS-12 that may be used when there is no need to simultaneously transmit USF to the EGPRS mobile. In particular, if the link to the EGPRS2-B mobile device will support DBS-12 (32 QAM), the reduction in data rate when also transmitting USF information to an EGPRS mobile device can be more than 80%.

Similarly, EGPRS2-A was designed to be backwards compatible with EGPRS. If the USF was being transmitted to an EGPRS mobile device while data is being transmitted to the EGPR2-A mobile device, packet data block types MCS-2, MCS-3, or DAS-5 through DAS-7 had to be used to transmit packet data to the EGPRS2-A mobile device. Alternatively, if the USF was being transmitted to an EGPRS2-A mobile device multiplexed with packet data being sent to an EGPRS2-B mobile device, the system could only use packet data block types DAS-5 through DAS-12 or MCS-2 or MCS-3 to transmit data to the EGPRS2-B mobile device. If DAS-5 through DAS-12 were used, these packet data block types had to be used continuously throughout the entire TBF, as it was not permitted to switch between DAS and DBS packet data block types within the TBF. Even if switching between DAS and DBS packet data block types within the TBF were allowed, HARQ could not be used unless the allowed packet data blocks types were restricted. Also, if DAS-5 through DAS-12 were always used for the EGPRS2-B mobile device multiplexed on the same uplink time slot as an EGPRS2-A mobile device, the better link performance and higher peak rates of the DBS packet data block types could not be obtained for the EGPRS2-B mobile device.

Currently, the packet data block types to be used within the TBF are signaled to the EGPRS2-B mobile device at the start of the TBF. The advantage of this method is that EGPRS2-A and EGPRS2-B mobile devices can now be USF multiplexed without any need to use MCS-2 and MCS-3 to transmit data to the EGPRS2-B mobile device and USF information to the EGPRS2-A mobile device during the same downlink time slot. The disadvantage of this method is that the EGPRS2-B mobile device cannot get the increased throughput achievable with packet data block types DBS-5 through DBS-12 when multiplexed with an EGPRS2-A mobile device because throughput of EGPRS2-A technology can be as much as 20% less than EGPRS2-B technology throughput.

Among other benefits, the present disclosure can overcome the deficiencies of prior methods and devices. For example, the present disclosure can improve the efficiency of USF multiplexing of EGPRS2-A and EGPRS2-B mobile devices in the same time slot. The present disclosure can also improve the efficiency of USF multiplexing of EGPRS2-B and EGPRS mobile devices in the same time slot. One reason is that currently, the standard does not allow the network to switch between GPRS, EGPRS, EGPRS2-A, and EGPRS2-B packet data block types within the TBF when transmitting to a mobile device. Currently, the set of packet data block types used to transmit to a particular mobile device can only be changed between TBFs, and the set of packet data block types to be used within the TBF is signaled to the mobile device at the start of the TBF.

Recently, there has been discussion of the possibility of switching between EGPRS2-A and EGPRS2-B packet data block types within the TBF when transmitting to the EGPRS2-B mobile device. Initially, it was believed that this could resolve the current difficulty in transmitting USF information to the EGPRS2-A mobile device while transmitting packet data blocks to the EGPRS2-B mobile device, because this could be accomplished by using the EGPRS2-A packet data block types DAS-5 through DAS-12 to transmit packet data blocks to the EGPRS2-B mobile device. Because the link performance and throughput of DAS-5 through DAS-12 is only slightly inferior to that of DBS-5 through DBS-12, the average throughput reduction to the EGPRS2-B mobile device associated with using this method (only when necessary to transmit USF to the EGPRS2-A mobile device while transmitting packet data blocks to the EGPRS2-B mobile device) would be quite small.

Because different families are defined for EGPRS2-A and EGPRS2-B technologies, if an EGPRS2-B A family packet data block type were used for the first transmission of an RLC block, it would not be possible to re-transmit the RLC block using any EGPRS2-A packet data block type, because the A family of RLC blocks does not exist within the EGPRS2-A technology. The only way to re-transmit an A block using EGPRS2-A technology would be to pad the A block (74 bytes) into a D block (8 more bytes), re-encode the padded RLC block, and re-transmit using an EGPRS2-A packet data block type belonging to the D family of RLC blocks. As there is currently no need for such padding, no padding method has been specified. However, if that method is used, it may not be possible to combine transmissions and re-transmissions using either Chase combining or incremental redundancy.

Similarly, if an EGPRS2-A D family packet data block type were used for the first transmission of an RLC block, it may not be possible to re-transmit the RLC block using any EGPRS2-A packet data block type because the D family of RLC blocks does not exist within the EGPRS2-B technology. Furthermore, because a D RLC block is larger than any EGPRS2-B RLC block, the D RLC bock may not be padded into a larger RLC block size and thus the D block cannot be re-transmitted using EGPRS2-B technology. Furthermore, the D RLC block may not be split for retransmission without the definition of additional signaling. Thus, there are some clear difficulties in switching between EGPRS2-A and EGPRS2-B packet data block types within the TBF as a means of resolving the USF signaling problem when EGPRS2-A and EGPRS2-B mobile devices are USF multiplexed on the same time slot. The present disclosure can solve these and other problems by switching between EGPRS2-A and EGPRS2-B packet data block types within the TBF when transmitting to the EGPRS2-B mobile device.

For USF multiplexing of EGPRS2-A mobile devices with EGPRS2-B mobile devices, it can be assumed that the network can switch between EGPRS2-A and EGPRS2-B packet data block types within the TBF when transmitting to an EGPRS2-B mobile device. In such a scenario, the following elements can be present:
the B RLC block is 56 bytes
the Ap RLC block is 68 bytes
EGPRS2-B packet data block types, including
   DBS-5 (1xB), DBS-7 (2xB), and DBS-9 (3xB) use B family RLC blocks
   DBS-11 (4xAp) uses Ap family RLC blocks
EGPRS2-A packet data block types, including
   DAS-5 (1xB) and DAS-8 (2xB) use B family RLC blocks
   DAS-6 (1XAp), DAS-9 (2xAp), and DAS-11 (3xAp) use Ap family RLC blocks
The number of RLC blocks in each packet data block type is indicated in parentheses above.

When packet data blocks for the EGPRS2-B mobile device are multiplexed with USF information for one or more EGPRS2-A mobile devices, the network could restrict the packet data block types used for the EGPRS2-B device by requiring first transmissions to the EGPRS2-B mobile device to use:
i) DBS-5, DBS-7, DBS-9, or DBS-11 if the first transmission to the EGPRS2-B mobile device is using the EGPRS2-B packet data block types and the network is not sending a USF to the EGPRS2-A mobile device during the same time slot; and ii) DAS-5, DAS-6, DAS-8, DAS-9, or DAS-11 if the first transmission is sent to the EGPRS2-B mobile device using EGPRS2-A packet data block types when the network is sending a USF to an EGPRS2-A mobile device during the same time slot.

RLC blocks first transmitted to the EGPRS2-B mobile device using DBS-5, DBS-7, or DBS-9 can be retransmitted using DAS-5 or DAS-8 if it is necessary to send a USF to the EGPRS2-A mobile device while retransmitting these packet data blocks to the EGPRS2-B mobile device. Similarly, RLC blocks first transmitted to the EGPRS2-B mobile device using DBS-11 can be retransmitted using DAS-6, DAS-9, or DAS-11 if it is necessary to send USF information to the EGPRS2-A mobile device while retransmitting these packet data blocks to the EGPRS2-B mobile device.

RLC blocks first transmitted to the EGPRS2-B mobile device using DAS-5 or DAS-8 can be retransmitted using DBS-5, DBS-7, or DBS-9 if there is no need to send USF information to the EGPRS2-A mobile device during the same time slot. RLC blocks first transmitted to the EGPRS2-B mobile device using DAS-6, DAS-9, or DAS-11 when the network is sending USF information to the EGPRS2-A mobile device can be retransmitted using DBS-11. However, unless the link quality for the EGPRS2-B mobile device is sufficient to support DBS-11, it may be useful to send the first EGPRS2-A transmission using DAS-5 or DAS-8 and re-transmit using DBS-5, DBS-7, or DBS-9. Chase combining and/or incremental redundancy can be used to combine and decode RLC block transmissions and retransmissions sent using EGPRS2-B and EGPRS2-A packet data block types, respectively.

The data rates for packet data block types DBS-5, DBS-7, DBS-9, and DBS-11 are evenly spaced within the set of data rates for packet data block types defined for EGPRS2-B technology, as is indicated below:

| DBS-5  | QPSK  | 22.4 kbps  |
|--------|-------|------------|
| DBS-6  | QPSK  | 29.6 kbps  |
| DBS-7  | 16QAM | 44.8 kbps  |
| DBS-8  | 16QAM | 59.2 kbps  |
| DBS-9  | 16QAM | 67.2 kbps  |
| DBS-10 | 32QAM | 88.8 kbps  |
| DBS-11 | 32QAM | 108.8 kbps |
| DBS-12 | 32QAM | 118.4 kbps |

Similarly, the data rates for packet data block types DAS-5, DAS-6, DAS-8, DAS-9, and DBS-11 are evenly spaced within the set of data rates for packet data block types defined for EGPRS2-A technology, as is indicated below:

| DAS-5  | 8PSK  | 22.4 ksps |
|--------|-------|-----------|
| DAS-6  | 8PSK  | 27.2 ksps |
| DAS-7  | 8PSK  | 32.8 ksps |
| DAS-8  | 16QAM | 44.8 ksps |
| DAS-9  | 16QAM | 54.4 ksps |
| DAS-10 | 32QAM | 65.6 ksps |
| DAS-11 | 32QAM | 81.6 ksps |
| DAS-12 | 32QAM | 98.4 ksps |

Thus, very little loss in data throughput should result if the EGPRS2-B link adaptation is limited to the subset of packet data block types DBS-5, DBS-7, DBS-9, DBS-11, DAS-5, DAS-6, DAS-8, DAS-9, and DAS-11 when the EGPRS2-B mobile device is multiplexed on the same uplink time slot with an EGPRS2-A mobile device, relative to the data throughput achievable when the EGPRS2-B mobile device is allowed to perform link adaptation over the full set of EGPRS2-B packet data block types (DBS-5 through DBS-12).

For USF multiplexing of EGPRS mobile devices with EGPRS2-B mobile devices, the network can use packet data block types MCS-2 or MCS-3 whenever transmitting packet data to the EGPRS2-B mobile device and USF information to the EGPRS mobile device during the same time slot. Since MCS-2 and MCS-3 are convolutionally encoded, it may not be possible to use either Chase combining or incremental redundancy to combine and decode transmissions of an RLC block first transmitted using any of the packet data block types DBS-5 through 12 and subsequently retransmitted using MCS-2 or MCS-3. Furthermore, because MCS-2 and MCS-3 use GMSK modulation while DBS-10, DBS-11, and DBS-12 all use 32 QAM modulation, the loss in data rate associated with USF signaling can be quite substantial. Thus, with the assumption that it is possible for the network to switch between EGPRS2-A and EGPRS2-B packet data block types within the TBF when transmitting to the EGPRS2-B mobile device, the following method can be used when the EGPRS2-B mobile device is USF multiplexed with an EGPRS mobile device, where first transmissions to the EGPRS2-B mobile device may use i) DBS-5, DBS-7, DBS-9, or DBS-11 if the first transmission to the EGPRS2-B mobile device is using the EGPRS2-B packet data block types and the network is not sending a USF to the EGPRS mobile device during the same time slot; and ii) DAS-5 or DAS-6 if the first transmission is sent to the EGPRS2-B mobile device using EGPRS2-A packet data block types and the network is sending a USF to an EGPRS mobile device during the same time slot.

With respect to (ii), the USF encoding for DAS-5, DAS-6, and DAS-7 is exactly the same as for MCS 5-9, and thus the EGPRS mobile device can demodulate and decode the USF information in these blocks.

RLC blocks first transmitted to the EGPRS2-B mobile device using DBS-5, DBS-7, or DBS-9 can be retransmitted using DAS-5 if it is necessary to send USF information to the EGPRS mobile device while retransmitting these packet data blocks to the EGPRS2-B mobile device. Similarly, RLC blocks first transmitted to the EGPRS2-B mobile device using DBS-11 can be retransmitted using DAS-6 if it is necessary to send USF information to the EGPRS mobile device while retransmitting these packet data blocks to the EGPRS2-B mobile device.

RLC blocks first transmitted to the EGPRS2-B mobile device using DAS-5 because the network is sending a USF to the EGPRS mobile device on the same time slot can be retransmitted using DBS-5, DBS-7, or DBS-9 when the network is not sending USF information to the EGPRS mobile device during the same time slot. RLC blocks first transmitted to the EGPRS2-B mobile device using DAS-6 because the network is sending USF information to the EGPRS mobile device during the same time slot can be retransmitted using DBS-11. However, unless the link quality for the EGPRS2-B mobile device is sufficient to support DAS-11, it may be useful to send the first transmission using DAS-5 and re-transmit using DBS-5, DBS-7, or DBS-9.

In general, if the first transmission to the EGPRS2-B mobile device uses an EGPRS2-A packet data block type, then the allowed EGPRS2-A packet data block types, DAS-5 or DAS-6, may be selected, which belong to the family of the allowed EGPRS2-B packet data block types, DBS-5, DBS-7, DBS-9, or DBS-11, used when not signaling USF information to the EGPRS mobile device. The following pairings can be appropriate:

| EGPRS2-B Packet Data Block Type | EGPRS2-A Packet Data Block Type |
|---|---|
| DBS-5 | DAS-5 |
| DBS-7 | DAS-5 |
| DBS-9 | DAS-5 |
| DBS-11 | DAS-6 |

By using the above method, it can be possible to USF multiplex EGPRS2-B and EGPRS mobile devices with a smaller impact on the packet data throughput of the EGPRS2-B mobile device. Without the method, MCS-2 and MCS-3 must be used when the network sends packet data blocks to the EGPRS-2 mobile device and USF information to the EGPRS mobile device during the same downlink time slot. Because MCS-2 and MCS-3 both use GMSK and convolutional encoding, the loss in packet data throughput to the EGPRS2-B mobile device can be significant. Conversely, with the method, the network can use packet data block types DAS-5 and DAS-6 to send packet data blocks to the EGPRS2-B mobile device and USF information to the EGPRS mobile device during the same time slot. Because DAS-5 and DAS-6 both use 8PSK and turbo codes, the loss in throughput to the EGPRS2-B mobile device associated with sending USF information to the EGPRS mobile device can be greatly reduced.

Figure 2:
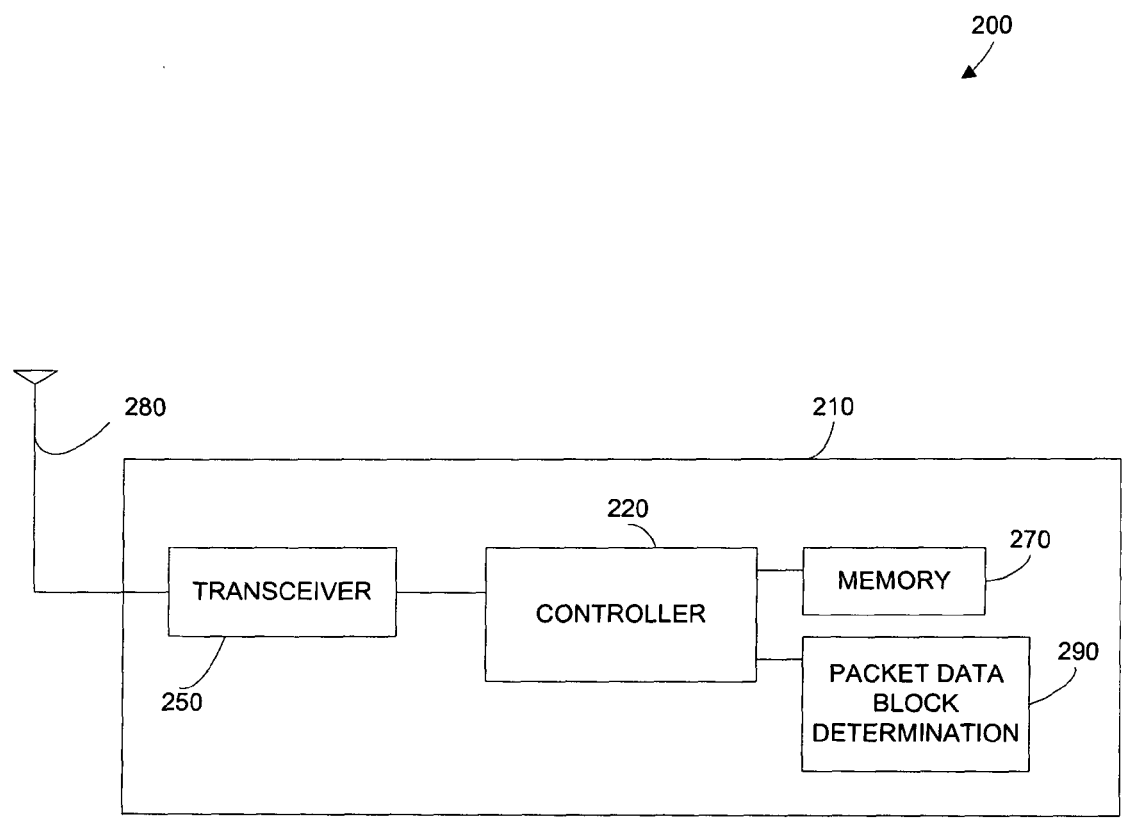
FIG. 2 illustrates an example block diagram of an apparatus in accordance with one embodiment.

FIG. 2 is an exemplary block diagram of an apparatus 200 that can be located at the base station 130, at the network controller 140, or anywhere else in the system 100, according to one embodiment. The apparatus 200 can include a housing 210, a controller 220 located within the housing 210, a transceiver 250 coupled to the controller 220, a memory 270 coupled to the controller 220, and an antenna 280 coupled to the transceiver 250. The apparatus 200 can also include a packet data block determination module 290. The packet data block determination module 290 can be coupled to the controller 220, can reside within the controller 220, can reside within the memory 270, can be an autonomous module, can be software, can be hardware, or can be in any other format useful for a module for an apparatus 200. The transceiver 250 may include a network interface, a transmitter, a receiver, and/or any other device capable of sending and receiving signals. The memory 270 may include a random access memory, a read only memory, an optical memory, or any other memory that can be coupled to a controller.

In operation, the controller 220 can control the operations of the apparatus 200. The transceiver 250 can send and receive signals to and from the apparatus 200. The packet data block determination module 290 can determine whether an enhanced general packet radio service 2-B mobile device and an enhanced general packet radio service non-2-B mobile device are assigned to a same uplink time slot. The packet data block determination module 290 can limit downlink communications to Ap and B radio link control block families when sending packet data blocks to the enhanced general packet radio service 2-B mobile device, if the enhanced general packet radio service 2-B mobile device and the enhanced general packet radio service non-2-B mobile device are assigned to the same uplink time slot. For example, the enhanced general packet radio service 2-B mobile device can use a different symbol rate from the enhanced general packet radio service non-2-B mobile device. The transceiver 250 can also transmit an uplink state flag to the enhanced general packet radio service non-2-B mobile device and transmit packet data blocks to the enhanced general packet radio service 2-B on the same downlink time slot.

The packet data block determination module 290 can also determine whether the enhanced general packet radio service non-2-B mobile device is an enhanced general packet radio service 2-A mobile device. The packet data block determination module 290 can determine whether an uplink state flag is being sent to the enhanced general packet radio service non-2-B mobile device during a first downlink time slot. The packet data block determination module 290 can limit downlink communications to the 2-B mobile device during the first downlink time slot to packet data block types DBS-5, DBS-7, DBS-9, and DBS-11, if the non-2-B mobile device is an enhanced general packet radio service 2-A mobile device and an uplink state flag is not being sent to the non-2-B mobile device. The packet data block determination module 290 can limit downlink communications to the EGPRS2-B mobile device during the first downlink time slot to packet data block types DAS-5, DAS-6, DAS-8, DAS-9, and DAS-11, if the EGPRS non-2-B mobile device is an enhanced general packet radio service 2-A mobile device and an uplink state flag is being sent to the non-2-B mobile device on the same downlink time slot.

The packet data block determination module 290 can additionally determine whether the enhanced general packet radio service non-2-B mobile device is an enhanced general packet radio service mobile device. The packet data block determination module 290 can determine whether an uplink state flag is being sent to the enhanced general packet radio service non-2-B mobile device during a downlink time slot. The packet data block determination module 290 can limit downlink communications to the EGPRS2-B mobile device during the downlink time slot to packet data block types DBS-5, DBS-7, DBS-9, and DBS-11, if the non-2-B mobile device is an enhanced general packet radio service mobile device and an uplink state flag is not being sent to the non-2-B mobile device during the same downlink time slot. The packet data block determination module 290 can limit downlink communications to the EGPRS2-B mobile device during the downlink time slot to packet data block types DAS-5 and DAS-6, if the EGPRS non-2-B mobile device is an enhanced general packet radio service mobile device and an uplink state flag is being sent to the non-2-B mobile device during the downlink time slot.

The transceiver 250 can multiplex signals for the enhanced general packet radio service non-2-B mobile device with signals for the enhanced general packet radio service 2-B mobile device in a single time slot. The transceiver can switch between an EGPRS non-2-B enhanced general packet radio service packet data block type and a 2-B enhanced general packet radio service packet data block type within a radio link control block family while sending packet data to the enhanced general packet radio service 2-B mobile device during a temporary block flow.

Figure 3:
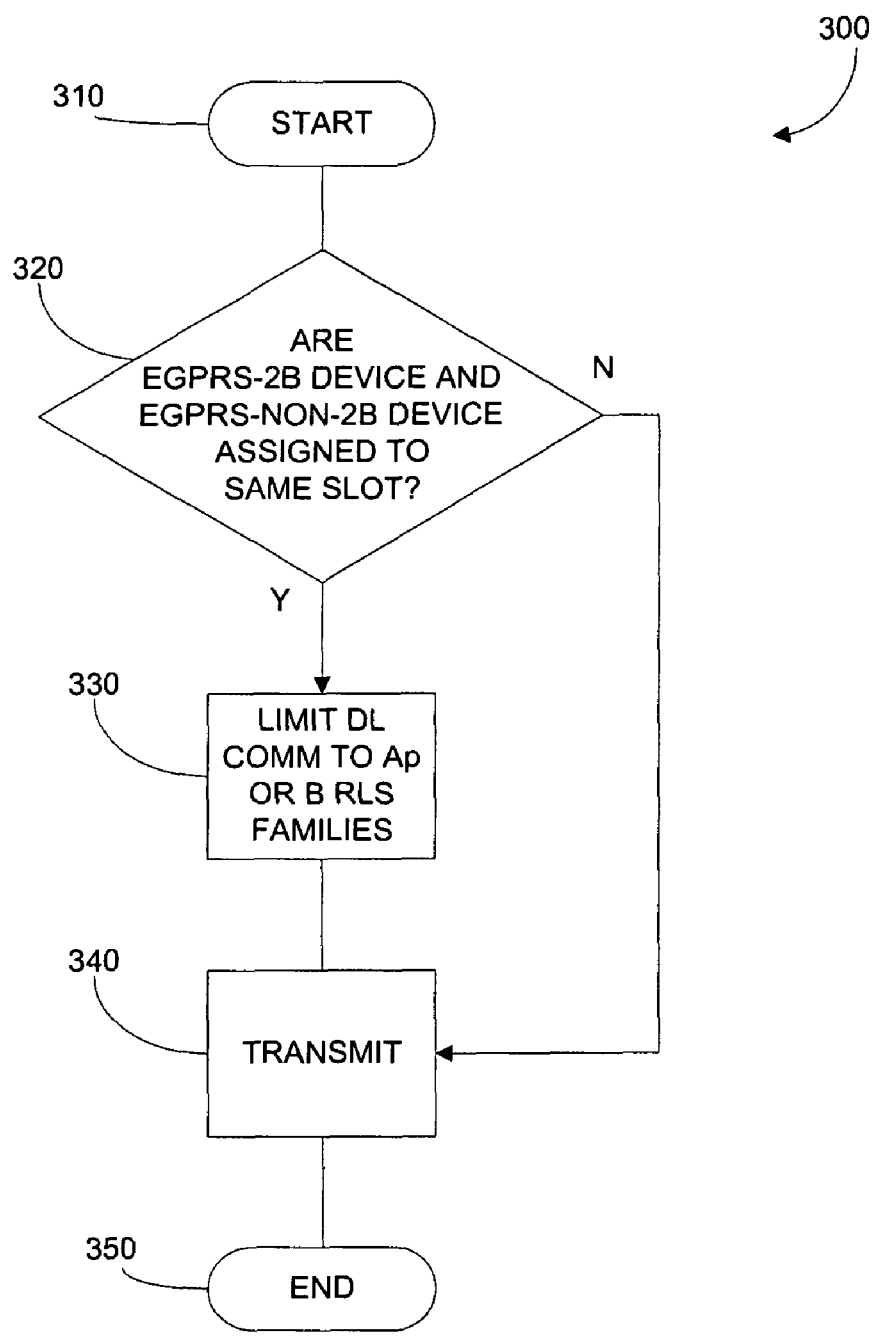
FIG. 3 shows a sample flowchart illustrating the operation of the apparatus of FIG. 2 in accordance with one possible embodiment.

FIG. 3 shows a sample flowchart 300 illustrating the operation of the apparatus 200 according to one possible embodiment. In step 310, the flowchart begins when the apparatus 200 is communicating with at least two mobile devices. In step 320, the apparatus 200 can determine whether an enhanced general packet radio service 2-B mobile device and an enhanced general packet radio service non-2-B mobile device are assigned to a same uplink time slot. In step 330, the apparatus 200 can limit downlink communications to Ap and B radio link control block families when sending packet data blocks to the enhanced general packet radio service 2-B mobile device, if the enhanced general packet radio service 2-B mobile device and the enhanced general packet radio service non-2-B mobile device are assigned to the same uplink time slot. In step 340, the apparatus 200 can transmit data and/or information to the mobile devices in accordance with the allowed RLC families.

For example, the enhanced general packet radio service 2-B mobile device can use a different symbol rate from the enhanced general packet radio service non-2-B mobile device. Meanwhile, the enhanced general packet radio service 2-B mobile device can support a non-2-B enhanced general packet radio service symbol rate. When transmitting in step 340, the apparatus 200 can transmit an uplink state flag to the enhanced general packet radio service non-2-B mobile device during a first downlink time slot and transmit packet data blocks to the enhanced general packet radio service 2-B mobile device also during the first downlink time slot.

The Ap radio link control block family can include packet data block types DAS-6, DAS-9, DAS-11, and DBS-11. The B radio link control block family can include packet data block types DAS-5, DAS-8, DBS-5, DBS-7, and DBS-9. The Uplink State Flag (USF) can be used on packet data channels to allow multiplexing of uplink radio blocks from different mobile stations. The USF can include 3 bits encoded within a radio block that is sent on a downlink. It can enable the coding of eight different USF states which can be used to multiplex the uplink traffic. Thirteen GPRS and EGPRS coding schemes may be specified for packet data traffic channels. For example, for packet data block types CS-2 to CS-4 and MCS-1 to MCS-4, the three bits USF-bits are encoded into twelve coded in a manner that is independent of the specific coding scheme. For these packet data block types, the USF-bits can therefore be decoded from these twelve bits in the same way. For the nine coding schemes MCS-1 to MCS-9, the block structure can differ between uplink and downlink since header sizes before coding are not the same.

Limiting in step 330 may include limiting downlink communications to Ap and B radio link control block families regardless of whether packet data is being sent to the enhanced general packet radio service 2-B mobile device, if the enhanced general packet radio service 2-B mobile device and the enhanced general packet radio service non-2-B mobile device are assigned to the same uplink time slot. Limiting in step 330 may also include limiting downlink communications to Ap and B radio link control block families only when sending packet data to the enhanced general packet radio service 2-B mobile device, if the enhanced general packet radio service 2-B mobile device and the enhanced general packet radio service non-2-B mobile device are assigned to the same uplink time slot. In step 350, the flowchart 300 can end when the packet data and/or USF has been transmitted.

Figure 4:
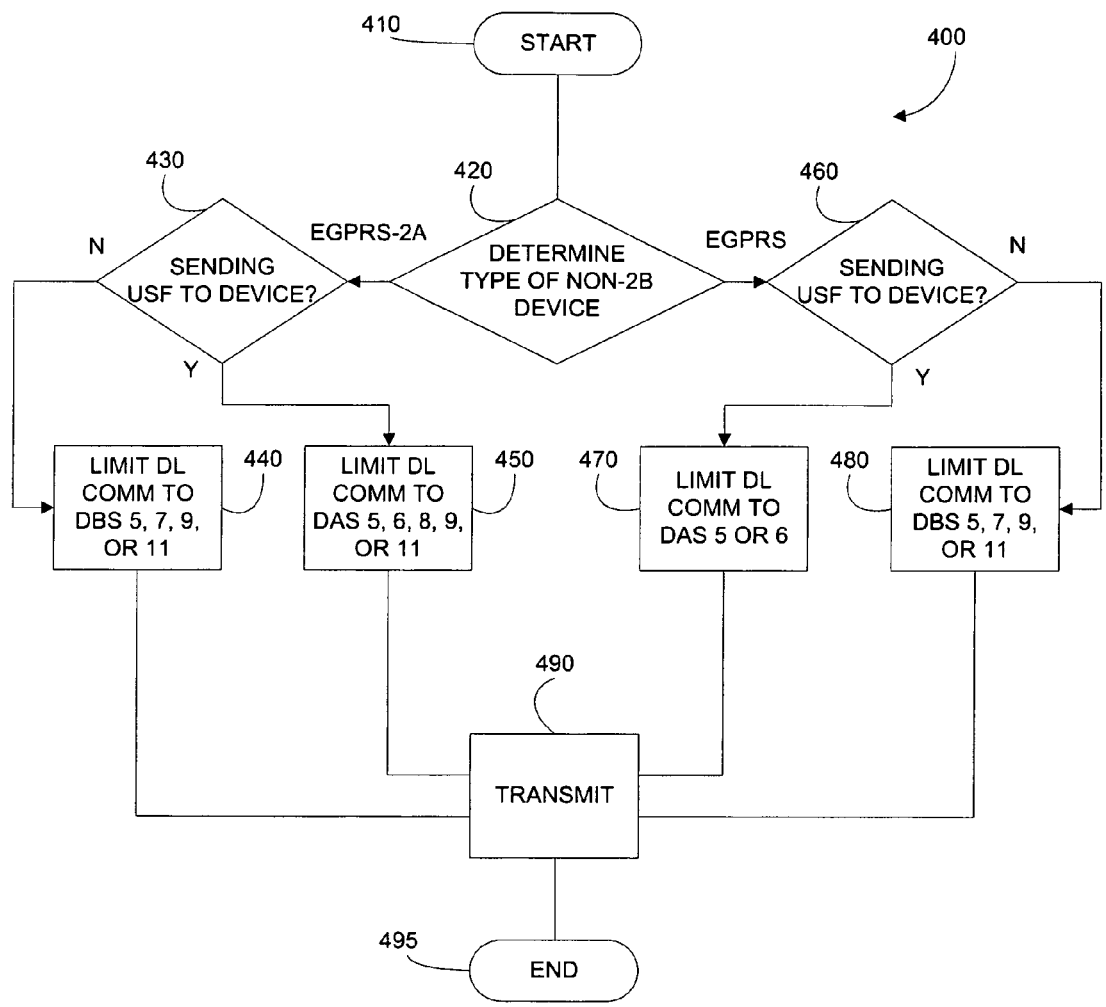
FIG. 4 shows a sample flowchart illustrating the operation of the apparatus of FIG. 2 in accordance with another possible embodiment.

FIG. 4 shows a sample flowchart 400 outlining the operation of the apparatus 200 according to another possible embodiment. In step 410, the flowchart 400 begins when the apparatus 200 is in communication with an EGPRS2-B mobile device and an EGPRS non-2-B mobile device. In step 420, the apparatus 200 can determine the type of enhanced general packet radio service non-2-B mobile device. If the enhanced general packet radio service non-2-B mobile device is an enhanced general packet radio service 2-A mobile device, in step 430, the apparatus 200 can determine whether an uplink state flag is being sent to the enhanced general packet radio service non-2-B mobile device during a first downlink time slot. In step 440, the apparatus 200 can limit downlink communications to the EGPRS2-B mobile device during the first downlink time slot to packet data block types DBS-5, DBS-7, DBS-9, and DBS-11, if the non-2-B mobile device is an enhanced general packet radio service 2-A mobile device and an uplink state flag is not being sent to the non-2-B mobile device during that downlink time slot. In step 450, the apparatus 200 can limit downlink communications to the EGPRS2-B mobile device during the first downlink time slot to packet data block types DAS-5, DAS-6, DAS-8, DAS-9, and DAS-11, if the non-2-B mobile device is an enhanced general packet radio service 2-A mobile device and an uplink state flag is being sent to the non-2-B mobile device during that downlink timeslot.

If step 420 determines that the enhanced general packet radio service non-2-B mobile device is an enhanced general packet radio service mobile device, for example, the enhanced general packet radio service non-2-B mobile device is not a 2-A or 2-B device, in step 460, the apparatus 200 can determine whether an uplink state flag is being sent to the enhanced general packet radio service non-2-B mobile device during a second downlink time slot. In step 470, the apparatus 200 can limit downlink communications to the EGPRS2-B mobile device during the second downlink time slot to packet data block types DAS-5 and DAS-6, if the non-2-B mobile device is an enhanced general packet radio service mobile device and an uplink state flag is being sent to the non-2-B mobile device during that time slot. In step 480, the apparatus 200 can limit downlink communications to the EGPRS2-B mobile device during the second downlink time slot to packet data block types DBS-5, DBS-7, DBS-9, and DBS-11, if the non-2-B mobile device is an enhanced general packet radio service mobile device and an uplink state flag is not being sent to the non-2-B mobile device during that time slot. The terms "first" and "second" are used to distinguish the two downlink time slots. Thus, the first downlink time slot and the second downlink time slot are not necessarily related either in time or any other dimension. In step 490, the apparatus 200 can transmit packet data and/or a USF. In step 495, the flowchart can end after the packet data and/or USF is transmitted.

Figure 5:
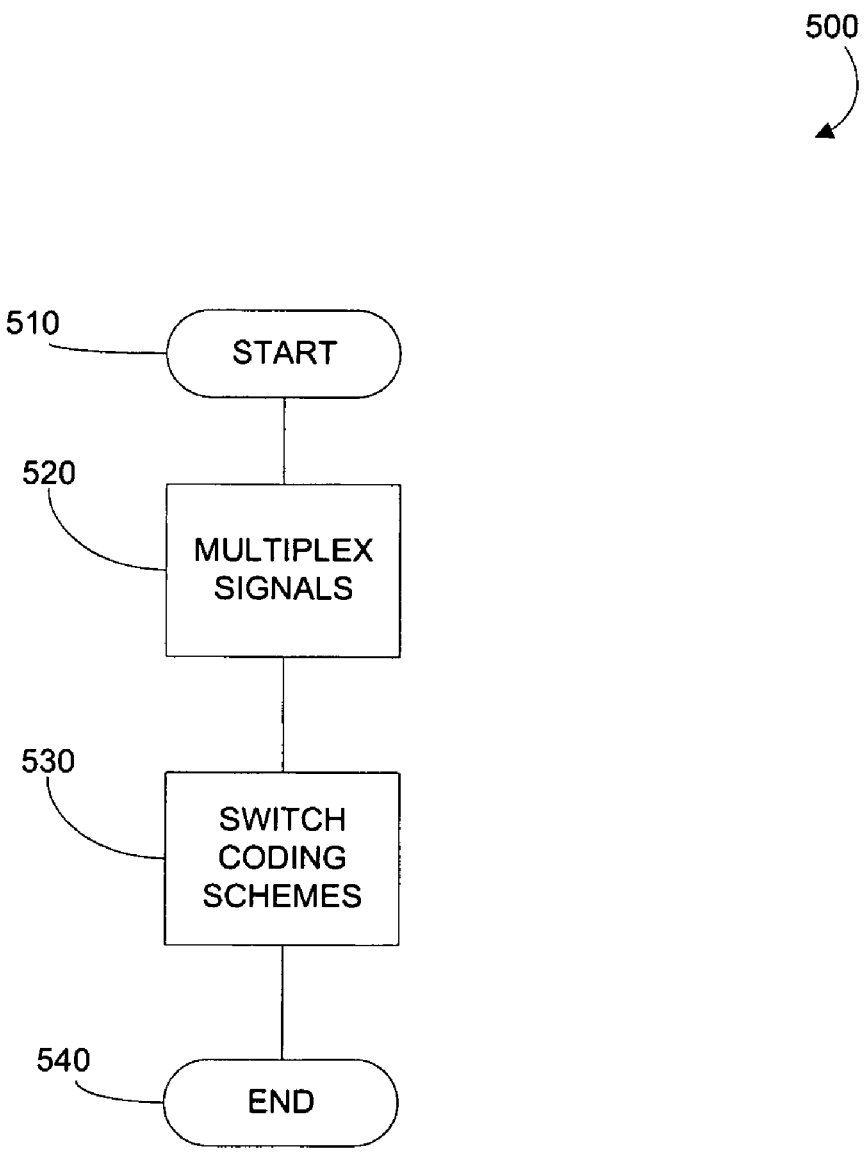
FIG. 5 shows a sample flowchart outlining the operation of the apparatus of FIG. 2 in accordance with a third possible embodiment.

FIG. 5 shows a sample flowchart 500 outlining the operation of the apparatus 200 according to a third possible embodiment. In step 510, the flowchart 500 begins when the apparatus 200 performs the step of transmitting per step 340 in FIG. 3 or step 490 in FIG. 4 or when the apparatus transmits packet data blocks to an EGPRS2-B mobile device and an EGPRS non-2-B mobile device. In step 520, the apparatus 200 can multiplex signals for the enhanced general packet radio service non-2-B mobile device with the enhanced general packet radio service 2-B mobile device in a single downlink time slot. In step 530, the apparatus 200 can switch between a non-2-B enhanced general packet radio service packet data block type and a 2-B enhanced general packet radio service packet data block type within a radio link control block family during a temporary block flow.

The radio link control block family can include Ap, B, and other radio link control block families. For example, the Ap radio link control block family can include packet data block types DAS-6, DAS-9, DAS-11, and DBS-11. The B radio link control block family can include packet data block types DAS-5, DAS-8, DBS-5, DBS-7, and DBS-9. The packet data block may stay within the same RLC family when switching between DAS and DBS block types and if an RLC block is being retransmitted. If no RLC block is being retransmitted, then families can be switched. If it is unknown whether a retransmission of a packet data block will be needed in the future, the transmission can be limited to DAS and DBS coding schemes belonging to RLC block size families that can be found in both DAS and DBS.

There can be more than one Ap family, where the "p" stands for "padding." For example, an Ap family can refer to an RLC block that is smaller than the A family that can be padded to fit into the A RLC block. However, as indicated in Tables 1 and 2, the Ap RLC blocks used for EGPRS2-A and EGPRS2-B are all 68 bytes. In step 540, the flowchart 500 can end when the temporary block flow is complete.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method comprising:
    determining whether an enhanced general packet radio service 2-B mobile device and an enhanced general packet radio service non-2-B mobile device are assigned to a same uplink time slot; and
    limiting downlink communications to an Ap radio link control block family and a B radio link control block family when sending packet data to the enhanced general packet radio service 2-B mobile device, if the enhanced general packet radio service 2-B mobile device and the enhanced general packet radio service non-2-B mobile device are assigned to the same uplink time slot.

2. The method according to claim 1, wherein the enhanced general packet radio service 2-B mobile device uses a different symbol rate from the enhanced general packet radio service non-2-B mobile device.

3. The method according to claim 1, wherein the enhanced general packet radio service 2-B mobile device supports a non-2-B enhanced general packet radio service symbol rate.

4. The method according to claim 1, further comprising:
transmitting an uplink state flag to the enhanced general packet radio service non-2-B mobile device during a first downlink time slot; and
transmitting packet data to the enhanced general packet radio service 2-B mobile device during the first downlink time slot.

5. The method according to claim 1,
wherein the Ap radio link control block family includes packet data block types DAS-6, DAS-9, DAS-11, and DBS-11, and
wherein the B radio link control block family includes packet data block types DAS-5, DAS-8, DBS-5, DBS-7, and DBS-9.

6. The method according to claim 5, further comprising:
determining whether the enhanced general packet radio service non-2-B mobile device is an enhanced general packet radio service 2A mobile device;
determining whether an uplink state flag is being sent to the enhanced general packet radio service non-2-B mobile device during a first downlink time slot;
limiting downlink communications to the 2-B mobile device during the first downlink time slot to packet data block types DBS-5, DBS-7, DBS-9, and DBS-11, if the non-2-B mobile device is an enhanced general packet radio service 2A mobile device and an uplink state flag is not being sent to the non-2-B mobile device; and
limiting downlink communications to the 2-B mobile device during the first downlink time slot to packet data block types DAS-5, DAS-6, DAS-8, DAS-9, and DAS-11, if the non-2-B mobile device is an enhanced general packet radio service 2A mobile device and an uplink state flag is being sent to the non-2-B mobile device.

7. The method according to claim 5, further comprising:
determining whether the enhanced general packet radio service non-2-B mobile device is an enhanced general packet radio service mobile device;
determining whether an uplink state flag is being sent to the enhanced general packet radio service non-2-B mobile device during a second downlink time slot;
limiting downlink communications to the 2-B mobile device during the second downlink time slot to packet data block types DBS-5, DBS-7, DBS-9, and DBS-11, if the non-2-B mobile device is an enhanced general packet radio service mobile device and an uplink state flag is not being sent to the non-2-B mobile device; and
limiting downlink communications to the 2-B mobile device during the second downlink time slot to packet data block types DAS-5 and DAS-6, if the non-2-B mobile device is an enhanced general packet radio service mobile device and an uplink state flag is being sent to the non-2-B mobile device.

8. The method according to claim 1, wherein limiting comprises:
limiting downlink communications to Ap and B radio link control block families regardless of whether packet data is being sent to the enhanced general packet radio service 2-B mobile device, if the enhanced general packet radio service 2-B mobile device and the enhanced general packet radio service non-2-B mobile device are assigned to the same uplink time slot.

9. The method according to claim 1, wherein limiting comprises:
limiting downlink communications to Ap and B radio link control block families only when sending packet data to the enhanced general packet radio service 2-B mobile device, if the enhanced general packet radio service 2-B mobile device and the enhanced general packet radio service non-2-B mobile device are assigned to the same uplink time slot.

10. The method according to claim 1, further comprising:
multiplexing signals for the enhanced general packet radio service non-2-B mobile device with the enhanced general packet radio service 2-B mobile device in a single downlink time slot; and
switching between a non-2-B enhanced general packet radio service packet data block type and a 2-B enhanced general packet radio service packet data block type within a radio link control block family during a temporary block flow.

11. The method according to claim 10, wherein the radio link control block family comprises coding scheme (CS) packet data block types, modulation and coding scheme (MCS) packet data block types, downlink 2A scheme (DAS) packet data block types, and downlink 2B scheme (DBS) packet data block types.

12. The method according to claim 10, wherein the radio link control block family comprises the Ap radio link control block family and the B radio link control block family.

13. The method according to claim 12,
wherein the Ap radio link control block family includes packet data block types DAS-6, DAS-9, DAS-11, and DBS-11, and
wherein the B radio link control block family includes packet data block types DAS-5, DAS-8, DBS-5, DBS-7, and DBS-9.

14. An apparatus comprising:
a controller configured to control operations of the apparatus;
a transceiver coupled to the controller, the transceiver configured to send and receive signals; and
a packet data block determination module coupled to the controller,
the packet data block determination module configured to determine whether an enhanced general packet radio service 2-B mobile device and an enhanced general packet radio service non-2-B mobile device are assigned to a same uplink time slot,
the packet data block determination module also configured to limit downlink communications to Ap and B radio link control block families when sending packet data to the enhanced general packet radio service 2-B mobile device, if the enhanced general packet radio service 2-B mobile device and the enhanced general packet radio service non-2-B mobile device are assigned to the same uplink time slot.

15. The apparatus according to claim 14, wherein the enhanced general packet radio service 2-B mobile device uses a different symbol rate from the enhanced general packet radio service non-2-B mobile device.

16. The apparatus according to claim 14, wherein the transceiver is configured to transmit an uplink state flag to the enhanced general packet radio service non-2-B mobile device and transmit packet data to the enhanced general packet radio service 2-B on the same downlink time slot.

17. The apparatus according to claim 14, wherein the packet data block determination module is configured to:
determine whether the enhanced general packet radio service non-2-B mobile device is an enhanced general packet radio service 2A mobile device;

determine whether an uplink state flag is being sent to the enhanced general packet radio service non-2-B mobile device during a first downlink time slot;

limit downlink communications to the 2-B mobile device during the first downlink time slot to packet data block types DBS-5, DBS-7, DBS-9, and DBS-11, if the non-2-B mobile device is an enhanced general packet radio service 2A mobile device and an uplink state flag is not being sent to the non-2-B mobile device; and limit downlink communications to the 2-B mobile device during the first downlink time slot to packet data block types DAS-5, DAS-6, DAS-8, DAS-9, and DAS-11, if the non-2-B mobile device is an enhanced general packet radio service 2A mobile device and an uplink state flag is being sent to the non-2-B mobile device.

18. The apparatus according to claim 14, wherein the packet data block determination module is configured to:

determine whether the enhanced general packet radio service non-2-B mobile device is an enhanced general packet radio service mobile device;

determine whether an uplink state flag is being sent to the enhanced general packet radio service non-2-B mobile device during a second downlink time slot;

limit downlink communications to the 2-B mobile device during the second downlink time slot to packet data block types DBS-5, DBS-7, DBS-9, and DBS-11, if the non-2-B mobile device is an enhanced general packet radio service mobile device and an uplink state flag is not being sent to the non-2-B mobile device; and limit downlink communications to the 2-B mobile device during the second downlink time slot to packet data block types DAS-5 and DAS-6, if the non-2-B mobile device is an enhanced general packet radio service mobile device and an uplink state flag is being sent to the non-2-B mobile device.

19. The apparatus according to claim 14, wherein the transceiver is configured to multiplex signals for the enhanced general packet radio service non-2-B mobile device with signals for the enhanced general packet radio service 2-B mobile device in a single time slot, and the transceiver is configured to switch between a non-2-B enhanced general packet radio service packet data block type and a 2-B enhanced general packet radio service packet data block type within a radio link control block family while sending packet data to the enhanced general packet radio service 2-B mobile device during a temporary block flow.

20. A method comprising:

determining whether an enhanced general packet radio service 2-B mobile device and an enhanced general packet radio service non-2-B mobile device are assigned to a same uplink time slot;

limiting downlink communications to communications selected from a group consisting of Ap and B radio link control block families when sending packet data to the enhanced general packet radio service 2-B mobile device, if the enhanced general packet radio service 2-B mobile device and the enhanced general packet radio service non-2-B mobile device are assigned to the same uplink time slot where the Ap radio link control block family includes packet data block types DAS-6, DAS-9, DAS-11, and DBS-11 and wherein the B radio link control block family includes DAS-5, DAS-8, DBS-5, DBS-7, and DBS-9;

multiplexing signals for the enhanced general packet radio service non-2-B mobile device with the enhanced general packet radio service 2-B mobile device in a single downlink time slot; and switching between a non-2-B enhanced general packet radio service packet data block type and a 2-B enhanced general packet radio service packet data block type within a radio link control block family while sending packet data to the enhanced general packet radio service 2-B mobile device during a temporary block flow.

\* \* \* \* \*